(12) United States Patent
Lee (10) Patent No.: US 10,875,437 B2
(45) Date of Patent: Dec. 29, 2020

(54) CUP HOLDER FOR AUTOMOBILE

(71) Applicant: NIFCO KOREA INC., Asan-si (KR)

(72) Inventor: Su Young Lee, Chungcheongnam-do (KR)

(73) Assignee: NIFCO KOREA INC.

( * ) Notice: Subject to any disclaimer, the term of this patent is extended or adjusted under 35 U.S.C. 154(b) by 288 days.

(21) Appl. No.: 16/196,386

(22) Filed: Nov. 20, 2018

(65) Prior Publication Data

US 2019/0152374 A1 May 23, 2019

(30) Foreign Application Priority Data

Nov. 23, 2017 (KR) .................. 20-2017-0005969 U (51) Int. Cl.
*B60N 3/10* (2006.01)

(52) U.S. Cl.
CPC ................... *B60N 3/106* (2013.01)

(58) Field of Classification Search
CPC ........... B60N 3/10; B60N 3/106; A47G 23/02
USPC ........................................ 296/37.8; 224/926
See application file for complete search history.

(56) References Cited

U.S. PATENT DOCUMENTS

| | | | |
|---|---|---|---|
| 5,839,711 A | 11/1998 | Bieck et al. | |
| 7,380,762 B2 * | 6/2008 | Takeichi | B60N 3/106 248/309.1 |
| 7,661,710 B2 | 2/2010 | Ikeda et al. | |
| 7,866,620 B2 * | 1/2011 | Kaemmer | B60N 3/106 248/311.2 |
| 8,113,477 B2 * | 2/2012 | Kaemmer | B60N 3/106 248/311.2 |
| 8,783,635 B2 * | 7/2014 | Kamiya | B60N 3/106 248/311.2 |
| 9,469,231 B2 | 10/2016 | Kang | |
| 9,561,745 B2 * | 2/2017 | Sawada | B60N 3/10 |
| 10,086,736 B1 * | 10/2018 | Jacobsen | B60N 3/106 |
| 2007/0145731 A1 | 6/2007 | Ikeda et al. | |
| 2015/0375658 A1 | 12/2015 | Kang | |

FOREIGN PATENT DOCUMENTS

| | | | |
|---|---|---|---|
| DE | 10112649 A1 * | 10/2002 | ............. B60N 3/106 |
| DE | 10346093 A1 * | 5/2005 | ............. B60R 11/02 |
| DE | 202019100361 U1 * | 4/2019 | ............. B60N 3/108 |

(Continued)

OTHER PUBLICATIONS

Written Decision on Registration issued for Korean Patent Application No. 20-2017-0005969 dated Dec. 4, 2018.

*Primary Examiner* — Hilary L Gutman
(74) *Attorney, Agent, or Firm* — Thomas Horstemeyer, LLP (57) ABSTRACT

A cup holder for an automobile according to the present disclosure includes: a housing having a reception portion with an opened upper portion; a flap installed in an opening formed in a wall of the reception portion, the flap configured to rotate about a hinge and having a front outer surface that is configured to comes into contact with an object received in the reception portion; a spring ring coupled to the housing so as to elastically support the flap; at least one shield formed on left and right sides of an outer surface of the flap to protrude outwards of the flap; and a stopper provided at the flap to protrude in a predetermined direction so as to allow the flap to rotate about the hinge to a predetermined position.

9 Claims, 8 Drawing Sheets

(56) References Cited

FOREIGN PATENT DOCUMENTS

| EP | 1671841 A1 * | 6/2006 | ............. B60N 3/106 |
|---|---|---|---|
| JP | 2007-168682 A | 7/2007 | |
| KR | 10-0243624 B1 | 3/2000 | |
| KR | 100543755 B1 * | 1/2006 | |
| KR | 10-2010-0049801 A | 5/2010 | |
| KR | 10-2018-0083216 A | 7/2018 | |
| WO | 2014/133282 A1 | 9/2014 | |

* cited by examiner

CUP HOLDER FOR AUTOMOBILE

CROSS-REFERENCE TO RELATED APPLICATION

This application is based upon and claims the benefit of priority from Korean Utility Model Application No. 20-2017-0005969, filed on Nov. 23, 2017, the entire contents of which are incorporated herein by reference.

TECHNICAL FIELD

The present disclosure relates to a cup holder for an automobile.

BACKGROUND

Conventionally, a cup holder for an automobile is installed, as a sliding type, to be accommodated in or drawn out from a center fascia panel on which an audio or air conditioner control panel or the like is installed. Alternatively, a cup holder for an automobile is installed on a console tray between a gear shift selector lever and the console box so as to be exposed.

In general, a reception hole for the cup holder has been formed to have a predetermined size. However, recently, a structure capable of accommodating various beverage containers having a variety of diameters has been adopted for such a reception hole. Further, a structure capable of firmly supporting an outer surface of a beverage container so as not to be shaken by vibration of the vehicle has been applied to such a reception hole.

For example, a cup holder for an automobile, disclosed in a related art, includes a housing having a reception portion opened in the upper portion thereof, a flap provided in an opening formed in a wall of the reception portion, and a band-type spring ring coupled to the outer portion of the housing so as to resiliently support the flap.

In the conventional automotive cup holder, when a cup is inserted into the reception portion formed in the housing, the outer surface of the cup is brought into contact with the flap provided in the opening of the reception portion, and the flap is resiliently supported by the spring ring, thereby supporting the cup such that the cup is not moved.

However, such a conventional cup holder for an automobile has a problem in that light is leaked through a gap formed between an outer surface of the flap and an inner surface of the opening formed in the wall of the reception portion such that the leaked light is visible through the gap. In addition, in a conventional cup holder, engagement protrusions, which are respectively formed under left and right sides of the outer surface of the flap, rotate about a hinge. Owing to the structural feature, such a conventional cup holder for an automobile has another problem in that when a front surface of the flap enters into the reception portion, support protrusions are brought into contact with the outer surface of the housing, which results in occurrence of frictional noise.

In the related art, there is an additional problem in that when a vehicle occupant pushes the flap by a finger from the inside of the reception portion by an angle larger than an assembly angle, the spring ring elastically supporting the flap is damaged and loses the function thereof, and the flap is separated as the hinge is released from the housing.

SUMMARY

Some embodiments of the present disclosure provide a cup holder for an automobile, in which light is prevented from being leaked through a gap formed between an outer surface of a flap provided in an opening formed in a housing and an inner surface of an opening formed in a wall of a reception portion. Further, some embodiments of the present disclosure provide a cup holder for an automobile in which, even when a vehicle occupant continuously pushes the flap, which is assembled in the opening of the housing to be rotatable about a hinge, by a finger from the inside of the reception portion, the flap is prevented from being rotated about the hinge by a predetermined range or more.

According to one embodiment of the present disclosure, there is provided a cup holder for an automobile comprising: a housing having a reception portion with an opened upper portion; a flap installed in an opening formed in a wall of the reception portion, the flap configured to rotate about a hinge and having a front outer surface that is configured to comes into contact with an object received in the reception portion; a spring ring coupled to the housing so as to elastically support the flap; at least one shield formed on left and right sides of an outer surface of the flap to protrude outwards of the flap; and a stopper provided at the flap to protrude in a predetermined direction so as to allow the flap to rotate about the hinge to a predetermined position.

The spring ring may be a band-type ring, and the spring ring is coupled to an outer portion of the housing.

The at least one shield may be formed on left and right sides of a rear portion of the outer surface of the flap.

The at least one shield may be elongated in a vertical direction (upward and downward direction).

The stopper may be provided at an upper portion of the flap.

The predetermined direction may be an upward direction.

The predetermined position may be a position in which the front outer surface of the flap is flush with the wall of the reception portion.

The at least one shield may be provided with an elastic bumper so as to prevent the shield from rubbing on an outer surface of the housing while being in direct contact with the outer surface of the housing.

The at least one shield may include a bumper configured to come into contact with the wall when the flap is pressed by the object and then restored to its original position.

The hinge may include an anchor portion formed by cutting an engaging elastic deformation portion, and the anchor portion may be configured to be deformed while the hinge is being inserted into a seating groove formed in the housing. In addition, the housing may comprise an engagement protrusion provided on an outer surface of the housing, the engagement protrusion configured such that an overlap section is formed between an outer surface of the anchor portion and an outer surface of the engagement protrusion after the hinge is inserted into the seating groove.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
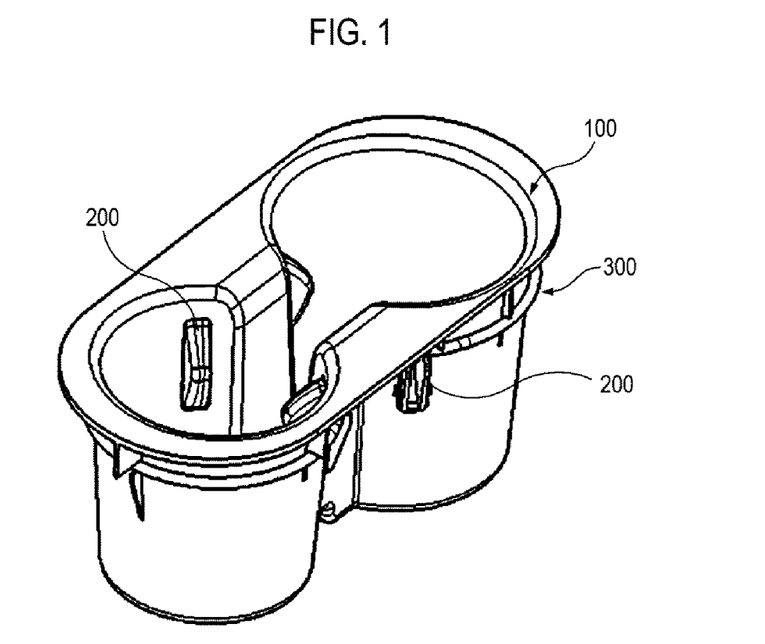
FIG. 1 is a perspective view showing a cup holder for an automobile according to one embodiment of the present disclosure.
Figure 2:
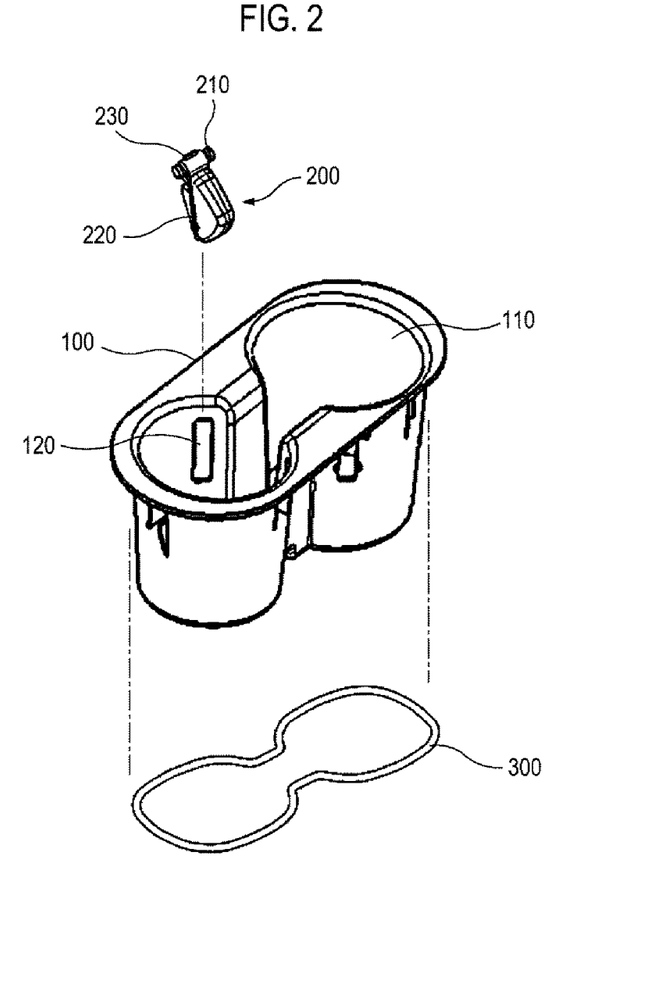
FIG. 2 is an exploded perspective view showing the configuration of the automatic cup holder for an automobile according to one embodiment of the present disclosure.
Figure 3:
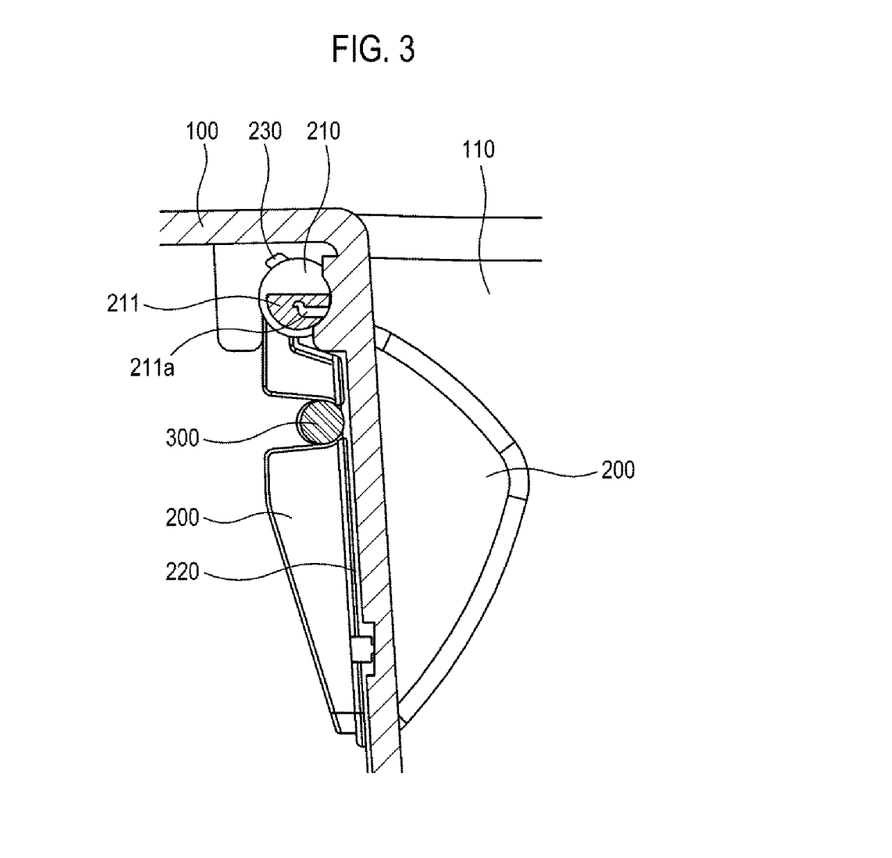
FIG. 3 is an enlarged view of one portion of the cup holder according to one embodiment of the present disclosure.
Figure 4:
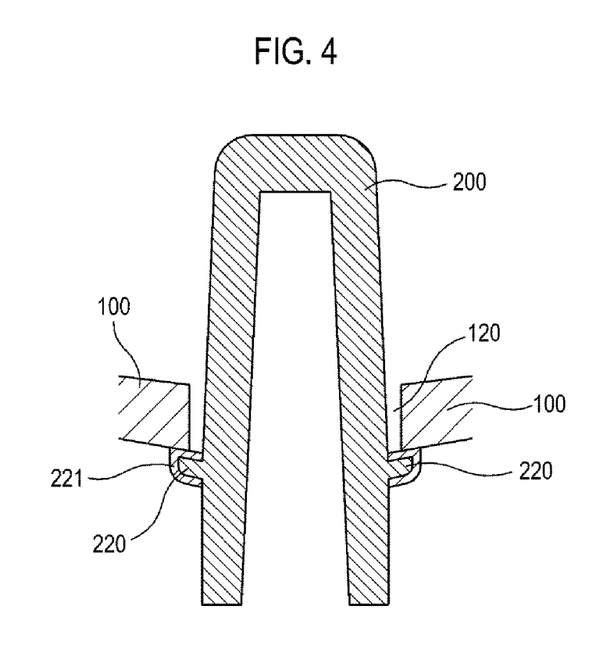
FIG. 4 is a plan section view showing the one portion of the cup holder for an automobile according to one embodiment of the present disclosure.
Figure 5:
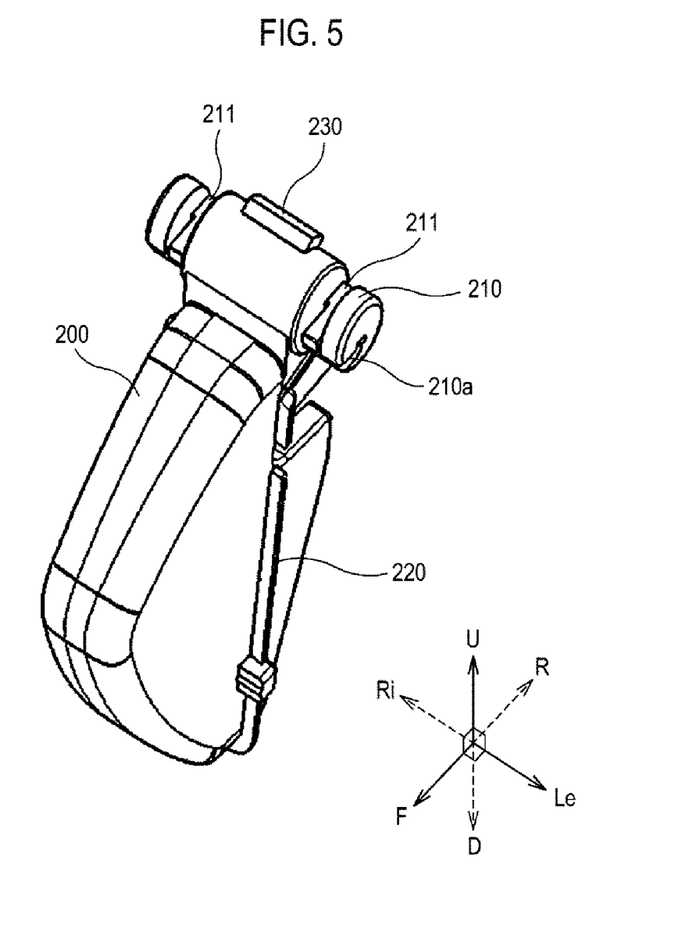
FIG. 5 is a perspective view showing a flap of the cup holder for an automobile according to one embodiment of the present disclosure.
Figure 6:
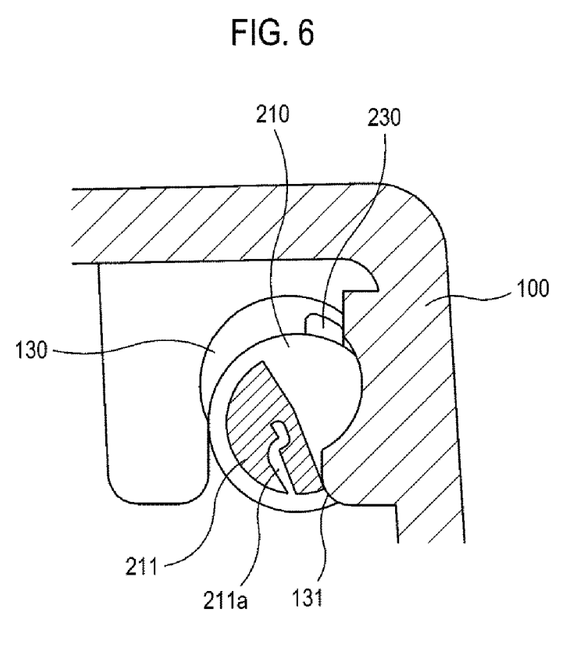
FIG. 6 is an enlarged view showing a state in which a hinge provided on the flap of the cup holder for an automobile is being inserted into a housing according to one embodiment of the present disclosure.
Figure 7:
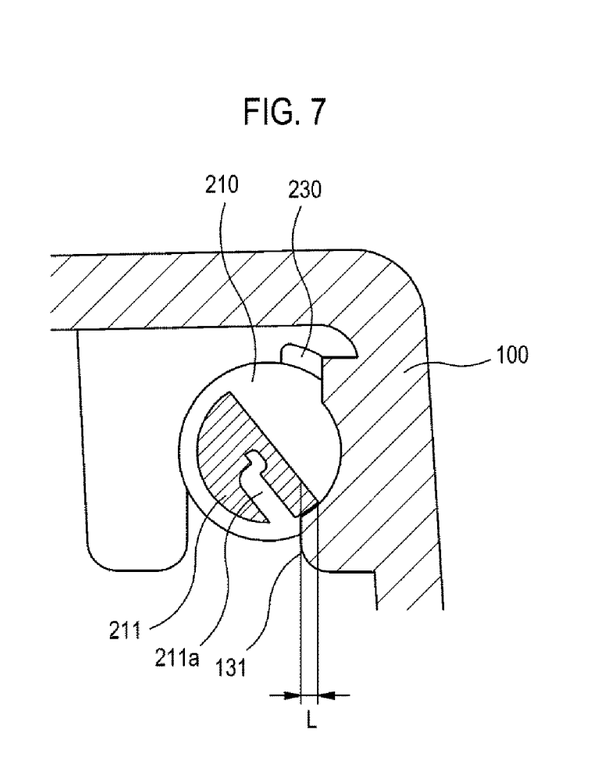
FIG. 7 is an enlarged view showing a state after the hinge provided on the flap of the cup holder for an automobile is inserted into the housing according to one embodiment of the present disclosure.
Figure 8:
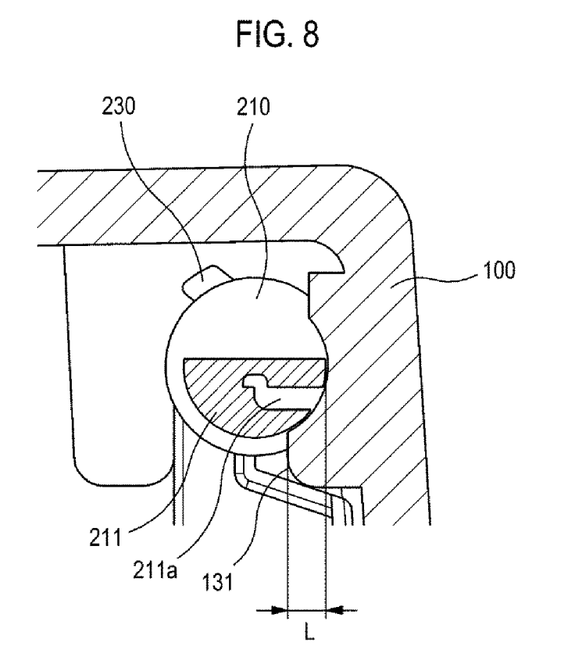
FIG. 8 is an enlarged view showing a state in which the flap of the cup holder for an automobile is mounted in the housing according to one embodiment of the present disclosure.

FIG. 1 is a perspective view showing a cup holder for an automobile according to the present disclosure, FIG. 2 is an exploded perspective view showing the configuration of the automatic cup holder according to the present disclosure, FIG. 3 is an enlarged view of one portion of the cup holder for an automobile of the present disclosure, FIG. 4 is a plan section view showing the one portion of the cup holder for an automobile according to the present disclosure, FIG. 5 is a perspective view showing a flap of the cup holder for an automobile according to the present disclosure, FIG. 6 is an enlarged view showing the state in which the hinge provided on the flap of the cup holder for an automobile of the present disclosure is inserted into a housing, FIG. 7 is an enlarged view showing the state after the hinge provided on the flap of the cup holder for an automobile of the present is inserted into the housing, and FIG. 8 is an enlarged view showing the state in which the flap of the cup holder for an automobile according to the present disclosure is mounted in the housing.

Expressions referring to directions such as "front (F)/rear (R)/left (Le)/right (R)/upper (U)/lower (D)" mentioned below are defined based on the illustrations in FIG. 5, but this is merely given to describe the present disclosure for clear understanding thereof, and it goes without saying that the respective directions may be defined differently depending on where the reference is placed.

As shown in FIGS. 1 to 8, a cup holder for an automobile according to the present disclosure includes a housing 100 having a reception portion 110 with an opened upper portion. The cup holder includes a flap 200 installed in an opening 120 formed in a wall of the reception portion 110. The flap 200 is configured such that the front outer surface of the flap 200 comes into contact with a received object received in the reception portion 110. The received object may be a cup or the like. The flap 200 is configured to rotate about a hinge 210 in a forward and backward direction. The flap 200 is configured to come into contact with a received object while rotating about the hinge 210. The cup holder includes a spring ring 300 coupled to the housing 100 so as to support the flap 200. The spring ring 300 may be band type. The spring ring 300 may be coupled to an outer portion of the housing. The spring ring 300 may be configured to elastically support the flap 200.

The cup holder includes at least one shield 220. The shield 220 may be layer-shaped. The shield 220 is formed on left and right sides of the outer surface of the flap 200. The shield 220 is formed on left and right sides of a rear portion of the flap 200.

In one embodiment, one shield 220 may be formed on left and right sides of the flap 200. For example, the one shield 220 may surround left, right and lower sides of the flap 200.

In another embodiment, shields 220 may include a first shield 220 formed on left side of the flap 200 and a second shield 220 formed on right side of the flap 200. The first shield 220 and the second shield 220 may be separated from each other.

The shield 220 elongates in a longitudinal direction. The shield 220 elongates in a vertical direction (upward and downward direction). The shield 220 protrudes outwards of the flap 200. The cup holder includes a stopper 230. The stopper 230 may be provided at an upper portion of the flap 200. The stopper 230 protrudes in a predetermined direction. The predetermined direction may be an upward direction. The stopper 230 is configured to allow the flap 200 to rotate about the hinge 210 only to a predetermined position. The predetermined position may be a position where a front surface of the flap 200 is flush with the wall of the reception portion 110.

The shield 220 provided on the left and right sides of the outer surface of the flap 200 in the longitudinal direction to protrude outwards may be molded integrally with the flap 200 during injection molding. However, it is understood that injection molding may be performed in the state in which separate shield 220, which are formed in various colors, may be inserted into a mold at the time of injection molding of the flap 200.

In addition, each of the shields 220 is provided with a bumper 221. The bumper is elastic like rubber. The bumper 221 is configured to come into contact with the wall of the reception portion 110. The bumper is configured to come into contact with the wall of the reception portion 110 when the flap 200 is pressed by the received object and then restored to its original position. The bumper 221 is more elastic than the wall of the reception portion 110.

The hinge 210 includes an anchor portion 211. The anchor portion 211 is formed by cutting an engaging elastic deformation portion 211a. The anchor portion 211 is configured to be deformed while the hinge 210 is being inserted into a seating groove 130 formed in the housing 100. The housing 100 includes an engagement protrusion 131. The engagement protrusion 131 is configured to provide a predetermined amount of overlap section L after the hinge 210 is smoothly inserted into the seating groove 130. The engagement protrusion 131 is provided on an upper portion of an outer surface of the housing 100.

In the present disclosure configured as described above, the flap 200 is installed in the opening 120 provided in the wall of the reception portion 110 of the housing 100. Further, the band-type spring ring 300 is coupled to the outer surface of the housing 100 so as to elastically support the flap 200.

In this configuration, when a load is applied upwards to the flap 200 in the state in which the anchor portion 211 provided on the hinge 210 is placed under the seating groove 130 provided in the housing 100, the anchor portion 211 is elastically deformed by the engaging elastic deformation portion 211a as shown in FIG. 6 and is inserted into the seating groove 130 as shown in FIG. 7.

As shown in FIGS. 7 and 8, since a predetermined amount of overlap section L is provided between the outer surface of the anchor portion 211 and the outer surface of the engagement protrusion 131, the anchor portion 211 inserted into the seating groove 130 is not released even when a received object, such as a cup, is inserted into or drawn out from the reception portion 110 of the housing 100. The engagement protrusion 131 is provided with the seating groove 130. The overlap section L is provided in the state in which the flap 200 is at the predetermined position. The overlap section L is provided even in the state in which the stopper 230 comes into contact with the outer surface of the housing 100. The overlap section L is a section in a forward and backward direction. The overlap section L is formed between an outer surface of the anchor portion 211 and an outer surface of the engagement protrusion 131 after the hinge 210 is inserted into the seating groove 130. The overlap section L is a section between a front point of the anchor portion 211 and a rear point of the engagement protrusion 131.

In addition, a gap, which is formed between the flap 200 and the opening 120, is shielded by the shield 220, whereby no light leakage phenomenon occurs. The gap is formed between an outer surface of the flap 200 and an inner surface of the opening 120. The flap 200 is installed to be rotatable about the hinge 210 in the opening 120 while being elastically supported by the elastic force of the spring ring 300. Since the stopper 230 comes into contact with the outer wall of the housing 100, the operation amount of the flap 200 is controlled such that the flap 200 rotates only to the predetermined position.

When the flap 200 is rotated about the hinge 210 to be returned to its original position, the bumper 221 absorbs frictional force while coming into contact with the outer surface of the housing 100, thereby preventing occurrence of frictional noise.

Even when an occupant on board in a vehicle cabin pushes the flap 200 by a finger in the interior of the reception portion, the stopper 230 is brought into contact with the outer surface of the housing 100 and the flap 200 is not rotated any more. Thus, it is possible to prevent in advance the spring ring 300, which elastically supports the flap 200, from being damaged and to prevent in advance the hinge 210 of the flap 200 from being released from the housing 100.

According to the present disclosure in some embodiments, even when an occupant in a vehicle cabin pushes the flap by a finger in the interior of the reception portion by an angle larger than an assembly angle, it is possible to prevent the flap from being rotated about the hinge beyond a predetermined range and to prevent in advance the flap from being released from the housing.

According to the present disclosure in some embodiments, since the gap, which is formed between the outer surface of the flap installed in the opening provided in the housing such that the flap is rotatable about the hinge while being elastically supported by the elastic force of the band-type spring ring and the inner surface of the opening provided in the wall of the reception portion, is shielded by the at least one shield, which is provided in the longitudinal direction on the left and light sides of the rear portion of the outer surface of the flap, no light leakage phenomenon occurs.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cup holder for an automobile, comprising:
    a housing having a reception portion with an opened upper portion;
    a flap installed in an opening formed in a wall of the reception portion, the flap configured to rotate about a hinge and having a front outer surface that is configured to come into contact with an object received in the reception portion;
    a spring ring coupled to the housing so as to elastically support the flap;
    at least one shield formed on left and right sides of an outer surface of the flap to protrude outwards of the flap, the at least one shield including a bumper configured to come into contact with the wall when the flap is pressed by the object and then restored to its original position; and
    a stopper provided at the flap to protrude in a predetermined direction so as to allow the flap to rotate about the hinge to a predetermined position.

2. The cup holder of claim 1, wherein the spring ring is a band-type ring, and
    the spring ring is coupled to an outer portion of the housing.

3. The cup holder of claim 1, wherein the at least one shield is formed on left and right sides of a rear portion of the outer surface of the flap.

4. The cup holder of claim 1, wherein the at least one shield is elongated in a vertical direction.

5. The cup holder of claim 1, wherein the stopper is provided at an upper portion of the flap.

6. The cup holder of claim 5, wherein the predetermined direction is an upward direction.

7. The cup holder of claim 1, wherein the predetermined position is a position in which the front outer surface of the flap is flush with the wall of the reception portion.

8. The cup holder of claim 1, wherein the hinge comprises an anchor portion formed by cutting an engaging elastic deformation portion, the anchor portion configured to be deformed while the hinge is inserted into a seating groove formed in the housing, and
    wherein the housing comprises an engagement protrusion provided on an outer surface of the housing, the engagement protrusion configured such that an overlap section is formed between an outer surface of the anchor portion and an outer surface of the engagement protrusion after the hinge is inserted into the seating groove.

9. A cup holder for an automobile, comprising:
    a housing having a reception portion with an opened upper portion;
    a flap installed in an opening formed in a wall of the reception portion, the flap configured to rotate about a hinge and having a front outer surface that is configured to come into contact with an object received in the reception portion;
a spring ring coupled to the housing so as to elastically support the flap;
at least one shield formed on left and right sides of an outer surface of the flap to protrude outwards of the flap, the at least one shield is provided with an elastic bumper; and
a stopper provided at the flap to protrude in a predetermined direction so as to allow the flap to rotate about the hinge to a predetermined position.

* * * * *